Oct. 11, 1966 P. E. BOUTMY 3,278,930

NON-LINEAR CODED SIGNAL DECODER

Filed Oct. 2, 1963

3 Sheets-Sheet 1

Oct. 11, 1966 P. E. BOUTMY 3,278,930

NON-LINEAR CODED SIGNAL DECODER

Filed Oct. 2, 1963 3 Sheets-Sheet 2

Oct. 11, 1966 P. E. BOUTMY 3,278,930

NON-LINEAR CODED SIGNAL DECODER

Filed Oct. 2, 1963

3 Sheets-Sheet 3

United States Patent Office 3,278,930 Patented Oct. 11, 1966

3,278,930
NON-LINEAR CODED SIGNAL DECODER
Patrick Emile Boutmy, Paris, France, assignor to Societe Anonyme de Telecommunications, Paris, France
Filed Oct. 2, 1963, Ser. No. 313,295
Claims priority, application France, Nov. 14, 1962, 915,293
6 Claims. (Cl. 340—347)

The present invention relates to a new device for receiving "digital," i.e. binary coded signal groups and for transforming them into variable amplitude analog signals. More precisely, the invention relates to a system in which a received coded signal permutation group including a number $p$ of coded electric pulses or "digits," each of which may have either of two possible signalling conditions, for instance its presence or absence, while each such different permutation group represents a different one of $(2^p-1)$ possible non-zero amplitude values of an original intelligence signal, is transformed into a restituted variable amplitude signal, according to a correspondence law which will now be precised.

It is well known that, when variable amplitude intelligence signals such as, for instance, telephone signals, are to be transmitted by so-called "pulse code modulation," it is desirable, to improve the signal-to-noise ratio of the system, especially at low signal levels, to compress the amplitude range of the intelligence signal before or during the coding process and, at the receiving end of the system, to expand the amplitude range of the decoded signal so as to give back the latter the original amplitude range.

It is also well known (see, for instance, the article by C. O. Mallinckrodt, Bell System Technical Journal, vol. XXX, 1951, pages 706 to 720) that the most advantageous compression law is the so-called "logarithmic compression," according to which the amplitude $V_c$ of the compressed signal is substantially proportional, at lower signal levels, to that V of the original, non-compressed signal and, at higher levels, to the logarithm thereof.

The mathematical form of the logarithmic compression law used in the system of the invention will now be precised. Assuming the instantaneous amplitude (or "signal voltage") of the intelligence signal to be transmitted to continuously vary between a positive peak voltage $V_m$ and a negative peak voltage $-V_m$, and designating by V the modulus of said signal voltage, the instantaneous amplitude $V_c$ of the compressed signal will be given by the formula (1) $$V_c=V_1 \log (1+V/v_0)$$

where $v_0$ and $V_1$ are suitably chosen voltage units, and "log" denotes the natural logarithm. The value of the ratio $V_m/v_0$ is selected according to the desired compression rate, which, in a known manner, is defined as the quotient of $V_m/v_0$ by the natural logarithm of $(1+V_m/v_0)$. By choosing a suitable magnitude $k$ for $v_0/V_1$, $V_c/v_0$ can be made to vary from zero to a maximum value equal to an integer number N which, for convenience, will be assumed to be equal to $(2^{p-1}-1)$, $p$ being the total number of "digits" (or elementary signals) in one coded group; the $p$th digit is reserved for indicating the polarity of V. As usual, the two possible values of each binary digit will be conventionally represented by 0 and 1.

The transformation of V into $V_c$ may be effected by any know means, which are no part of the invention. Coding is thereafter effected by sampling $V_c$ at regular time intervals recurring with a period T; by "quantization" the closed integer number $n$ to $V_c$ is substituted therefor, and one particular permutation group of coded signals each having a constant duration $t_1$, $(p-1)$ of which represent the value of $n$ and one of which represents its polarity, are transmitted through any communication link to the receiver.

In the latter, upon receiving a particular coded group, the decoder must be capable of delivering at its output a "decompressed" or expanded voltage proportional to the original V. In other words, from a given $n$, the decoder has to build again the reconstituted voltage V given by (2) $$v_0 \exp. (kV_c/v_0)-v_0$$

or (3) $$V=v_0 \exp. (kn)-v_0$$

Since:

$$V_c=nv_0$$

and putting:

$$V_0=v_0 \exp. kN$$

It is found that:

(4) $$V=V_0 \exp. k(n-N)-v_0$$

Thus, to reconstitute V from $n$, to the degree of approximation allowed by the quantizing operation, it is just necessary that the decoder performs, from known N and $n$, and with the aid of two fixed voltages $V_0$ and $v_0$, the operation symbolically represented by Formula 4.

The main advantage of the system of the invention resides in that it makes possible to perform the latter operation with a degree of accuracy better than in the known systems. According to the invention, this is effected as follows: for each received coded signal group, a condenser of capacity value C is initially charged at a fixed direct-current voltage $(V_0-v_0)$; subsequently, the condenser is discharged at a rate proportional to $(N-n)$ through a resistance, the value of which is controlled by the received coded group in such a manner that the reciprocal $1/R$ of its value be proportional to $(N-n)$. After a fixed discharge time $T_1$, the voltage across the condenser is sampled and a fixed voltage $v_0$ is subtracted therefrom. It is apparent that, if the product $T_1/CR$ is made equal to $k(N-n)$, the voltage resulting from the just mentioned subtraction operation is equal to V., i.e. to the initial signal voltage.

More precisely, a preferred form of embodiment of the invention comprises:

(a) Means for receiving coded signal pulse groups, eventually comprising a pulse shaper.

(b) A time base distributing properly timed control pulses and driven from a clock pulse generator itself synchronized by the received pulses.

(c) Circuit means for transferring said pulses to a memory device.

(d) A memory device storing the signalling condition of each received pulse, said memory device comprising a first part sequentially controlled by control pulses from said time base synchronically with the arrival of each successive pulse in one group, and a second part controlled by control pulses from said time base synchronically with the arrival of the last pulse in same said group, or at a slightly later time.

(e) Switching means controlled by said memory device and by further control pulses from said time base for combining in parallel connection at least part of a plurality of fixed resistors; said switching means also comprising first and second selection means for selecting a first one of two direct-current sources of voltages $(V_0-v_0)$ and $-(V_0-v_0)$ and a second one of two further direct-current sources of voltages $-v_0$ and $+v_0$, means controlled by part of said further control pulses for causing said first selected source to charge a condenser and for subsequently disconnecting said condenser from said first selected source, means controlled by a further part of said further timing pulses for connecting said resistance across said condenser, further means controlled by a still further part of said further control pulses for sampling the voltage across said condenser at a predetermined time $T_1$ after the instant of the connecting of said resistance to said condenser, means for subtractively combining said sampled voltage with that of said second selected voltage source into a restituted signal voltage, and means controlled by latter said control pulses for selectively impressing said restituted voltage upon one selected of a plurality of utilization circuits.

The advantages of the invention will be better understood from the hereinafter given detailed description and the annexed drawings, in which.

For greater simplicity of the description, and without limiting thereby the scope of the invention, it will be assumed in the following that a six-digit code is used, with the first digit in time order denoting the polarity of the intelligence signal to be restituted. The particular selected code will be, for positive intelligence signals, the "binary arithmetic" code, i.e. that in which the number $n$ representing the magnitude of a coded signal is obtained by adding, for the "1" pulses, the products of a constant reference amplitude by the successive decreasing powers of two, said powers of two being replaced by zero for each "0" pulse. For negative signals a code complementary to the preceding will be used, i.e. a negative amplitude will be represented by a coded group obtained by replacing all "0" pulse by "1" pulses (and reciprocally) in the group representing a positive amplitude of equal absolute magnitude.

The choice of this particular code makes it possible, as will appear later on, to simplify the decoding equipment. However, any other permutation code could as well be employed.

It will also be assumed that the invention is applied to a multiple-channel time division telephone transmission system; but, of course, this is not a limitation of the scope of the invention, which might as well be applied to the transmission of any form of single or multiple channel intelligence signals.

Figure 1:
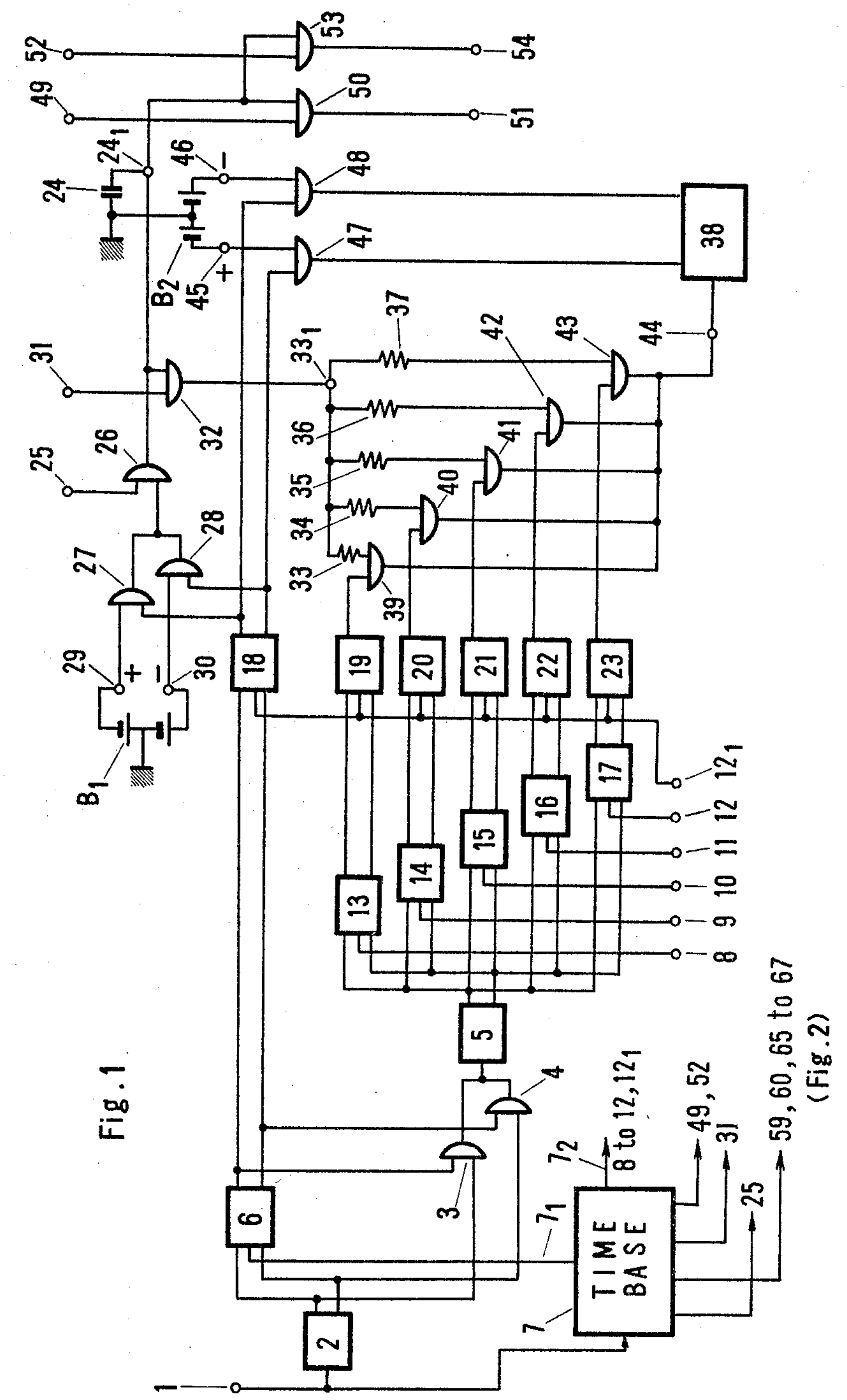
FIG. 1 shows a general diagram of a decoder according to the invention.

Referring now to FIG. 1, the incoming coded pulses, for instance from a transmission line, are received at terminal 1 and applied to a pulse shaper 2 of any description, for instance a conventional bistable multivibrator (also called flip-flop) which delivers signals at one or the other of its two outputs according to the signalling condition of each received pulse applied at its input. Signals from the two outputs of 2 are transmitted to the input terminals of two electronic gates 3, 4, to the control terminals of which are applied control signals alternatively obtained in a manner which will now be described.

The two outputs of 2 are respectively connected to the two inputs of a "time-controlled" bistable device 6. The latter is a bistable device of a known type which is made operative only when it is submitted, through a suitable control terminal with which it is provided, and through connection $7_1$, to a control pulse from the time base 7 synchronized by the pulses received at 1. The timing of the control pulse applied to 7 is such that it coincides with the first digit, i.e. the "polarity" digit in each coded group. Thus the device 6 takes one or the other of its two possible states according to the signalling condition of said first digit; for instance a positive voltage appears at one or the other of the two outputs of 6. Through connections $6_1$ or $6_2$, said positive voltage is transmitted to the control terminal of one or the other of gates 3 or 4, according to the case, and one of these gates or the other is rendered conducting according to the polarity of the transmitted intelligence signal, as soon as the polarity digit of one group has been received. At the same time, the voltages from the two outputs of 6 are respectively transmitted to one and the other of the two inputs of another time-controlled bistable device 18, which is a part of the memory device of the system and which will be made operative at a suitable time later.

Pulses from the outputs of either of gates 3 and 4, corresponding to the further digits of the received group, are subsequently transmitted through a single connection to the input of a bistable circuit 5, provided with two outputs. Since either of gates 3 and 4 receives a positive voltage from the corresponding one of the two outputs of pulse shaper 2 according to the signalling condition of the first pulse received at 1, and since a positive voltage, for instance, appears at one or the other of the outputs of 2 according to which signalling condition momentarily prevails, it is obvious that, according to the signalling condition of the polarity digit, the further digits will, for instance, be transmitted through 3 with their initial signalling condition, while, for the other polarity, they will be transmitted through 4 with an inverted signalling condition. This is the reason for the choice of the above-mentioned particular code, thanks to which the just described arrangements may work in such a manner that the conditions at each of the outputs of 5 now depend only on the absolute magnitude of the transmitted intelligence signal, not on its polarity.

One of the two outputs of 5 is connected to one corresponding of the two inputs of all of the five bistable devices 13 to 17, while the other of the outputs of 5 is connected to the other inputs of all of the latter bistable devices. The devices 13 to 17 constitute what will be called the "intermediate memory." As each one of them must be sensitive to one of the digits of each coded group only, 13 to 17 are made operative sequentially by suitably timed control pulses delivered by 7 to their respective control terminals 8 to 12 through connection $7_2$, which, although shown in the drawing as a single connection, actually is a multiple connection separately feeding terminals 7 to 12 with properly time-staggered control pulses. The control pulse corresponding to terminal 12 is applied thereto simultaneously with the arrival at 1 of the last pulse in the considered coded group and operates 17. Finally, a last control pulse, somewhat delayed with respect to that applied to 12, is applied to $\mathbf{12_1}$ and causes the whole of the digital information stored in devices 13 to 17 to be transferred to the part of the "final memory" consisting of the five bistable devices 19 to 23. The bistable device 18, which is also a part of the final memory, has already been actuated, as already explained.

The full information—polarity and amplitude of the intelligence signal—corresponding to the considered coded group is now stored in the "final memory" 18 to 23, each element of which corresponds to a coded pulse, this having been effected during a time interval T equal to or slightly longer than that $6t_1$ allowed to the six digits of the same said group. Now, during a succeeding time interval of the same duration T, decoding will be accomplished.

Alternatively, the time interval T could be reduced exactly to $6t_1$, in which case the bistable devices 17 and 23 could be operated simultaneously (one of them could even be omitted), with control terminals 12 and $\mathbf{12_1}$ connected to a common wire fed from time base 7. However, it is preferable in practice that a short extra time interval be allowed for the transferring of the information from the intermediate to the final memory. As already mentioned, the polarity, registering bistable device 18 has been actuated through 2 and 6 by the first pulse in the coded group. One or the other of gates 27 and 28 is thus made operative and connects to the input of gate 26 the positive terminal 29 or the negative terminal 30 of battery $B_1$ of total voltage $2(V_0-v_0)$, the midpoint of which is grounded. Simultaneously, a suitably timed control pulse delivered by the time base to the control terminal 25 of 26 causes the voltage $\pm(V_0-v_0)$ from $B_1$ to be applied to the terminal $24_1$ of condenser 24, the other terminal of which is grounded. Thus condenser 24 is charged to a potential $\pm(V_0-v_0)$ according to the polarity of the intelligence signal to be decoded. This is normally effected during a time interval approximately equal to $T/6$, i.e. to the duration of one coded pulse. Simultaneously the output of 18 makes operative one or the other of gates 47 and 48, causing the positive or negative terminal of battery $B_2$ of voltage $2v_0$, the midpoint of which is grounded, to be connected to network 38, and a potential $+v_0$ or $-v_0$ (with respect to ground) appears at point 44. The mutual connections between $B_2$, 47, 43 and 38 are so arranged that the potential appearing at 44 be always of the opposite polarity to that appearing at the non-grounded terminal $24_1$ of condenser 24. The resistance of 38 between 44 and ground is supposed to be very low.

The network 38 may consist, for instance, of adjustable resistances, potentiometers, etc, and does not need to be described in detail. Its purpose is just reducing the voltage of battery $B_2$ to the small and precise value required for the correct operation of the system.

After a small time interval, which may be conveniently taken equal to or slightly less than the duration $t_1$ of a coded pulse, the control pulse applied to 25 disappears and gate 26 becomes non-conducting.

Condenser 24 is charged at potential $+(V_0-v_0)$ or $-(V_0-v_0)$ according to the case and is now isolated from its charging circuit. Time base 7 then delivers to the control terminal 31 of gate 32 a comparatively long control pulse of duration $T_1$. By way of example, it may be assumed that $T_1$ is equal to $3t_1$. This causes 24 to be connected to the common point $33_1$ to resistors 33 to 37.

On another hand, the previous transferring to the bistable devices 19 to 23 of the signals stored in 13 to 17 has caused direct-current potentials to appear at their outputs, some of said potentials having for instance a positive value, and some possibly being zero, according to the respective signalling conditions of the corresponding coded pulses. These potentials are used as control signals for gates 39 to 43, of which those corresponding to a "zero" coded pulse become conducting, while those corresponding to a "one" coded pulse remain non-conducting, and some of the resistors 33 to 37 are thus connected in parallel with condenser 24.

Resistors 33 to 37 are of unequal values and in fact, their respective values increase with their rank number in proportion with successive increasing powers of two.

Consequently the total conductance $(1/R)$, in parallel connection with the condenser through gate 32 and those of gates 39 to 43 which are conducting, is proportional to the complement to N of the number $n$ proportional to the amplitude $V_c$ of the compressed signal (neglecting the small error due to quantization).

Thus:

$$1/R=(N-n)/R_0$$

$R_0$ being a reference resistance value.

After a discharge time $T_1$, taking in account the additional voltage $\pm v_0$ introduced at 44 in the discharge path, the voltage across the condenser will be $$[V_0 \exp. (-(N-n)t_1/CR_0)-v_0]$$

Comparing this value with that given by Formula 4, it is immediately seen that the first term of the right-hand member of Formula 4 is obtained by making $1/CR_0$ equal to $k$, either by the choice of C or by that of $R_0$. The time interval $T_1$, which must be lesser than the time interval T allowed to one coded group, will be assumed, by way of example, to be equal to $3t_1$, i.e. to three times the duration of a coded pulse.

Thus, neglecting the internal resistance of the gates (which could be taken account of by slight changes in the values of the associated resistors), there appears, between point $24_1$ of FIG. 1 and the ground and at an instant spaced by the time interval $T_1$ from that at which the discharge of condenser 24 is initiated, a total voltage equal to that represented by the first term of Formula 4 less the fixed voltage $v_0$ at point 44. This total voltage is thus equal to the desired original signal voltage V of the latter formula.

Having been thus sampled at the proper instant, through one of the gates such as 50, 53 controlled by control pulses from time base 7 applied to the control terminals 49, 52 of latter said gates, the signal voltage V is transferred to a corresponding one of a plurality of utilization circuits, not shown in the drawing except in the form of their input terminals 51, 54. In the case of a multiple-channel telephone system, the arrangement (50, 53) (49, 52) (51, 54) plays the part of a channel distributor, two elements of which only have been represented in the drawing, although, of course, in practice, the number of channels would generally be much higher. Proper timing of the control pulses delivered by time base 7 to gates such as 49 and 52 ensures that each decoded signal be directed to the corresponding utilization circuit. At the end of the time interval allowed for the decoding, a gate such as 50 will be closed, and the same cycle of operations will begin again with another channel and another gate such as 53.

Up to now it has been supposed that, in the case of a multiple channel system, the time allowed for the decoding of each coded group is equal to that T allowed for the transmission of said coded group. An improved system will now be described in which twice as much time may be allowed for the decoding of a coded group as is necessary for transmitting said group and storing it in the memory device. For this purpose, the channels will be divided into odd and even rank channels, and a part of the circuit of FIG. 1 will be replaced by a circuit comprising twice as many elements as formerly.

Figure 2:
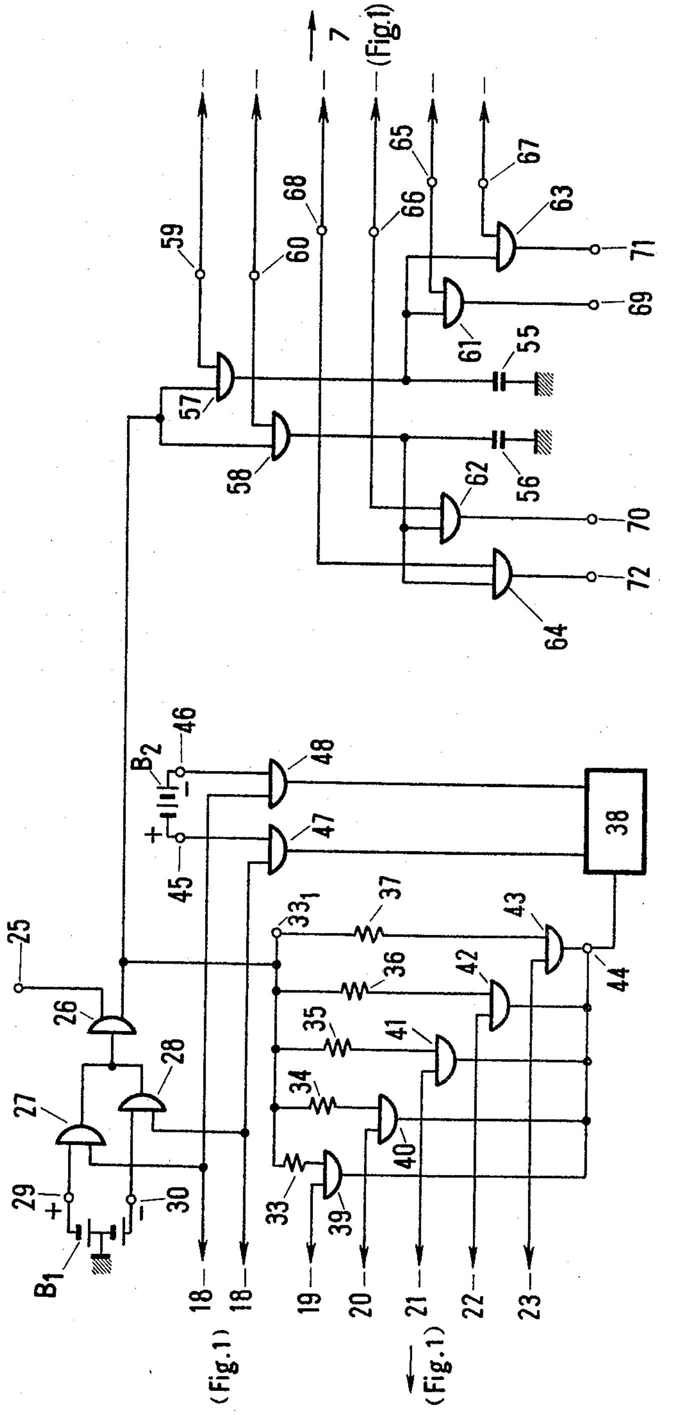
FIG. 2 shows a variant of embodiment of the decoder of FIG. 1.

Referring now to FIG. 2, in which certain parts only of the diagram of FIG. 1 have been repeated, the elements such as gates 19 to 23, and 26 to 28 play the same part as in FIG. 1, as well as resistors 33 to 37, gates 47 and 48, batteries $B_1$ and $B_2$, and network 38. However, the diagram of FIG. 2 comprises two condensers with two corresponding charging and discharging paths and two groups of channel-distribution gates, respectively associated with one and the other of said condensers.

In FIG. 2, a first terminal of each of the condensers 55 and 56 is grounded, while their second terminal is connected to a gate, 57 or 58 respectively. Through their control terminal 59 or 60, gates 57 and 58 are alternately open or closed. The second terminal of each condenser is also connected to the inputs of as many gates 61 and 63, or 62 and 64, respectively, as there are odd or even channels in the system. The opening and closing of the gates is controlled from the time base through the control terminals 65 and 67 or 66 and 68. Through the channel distribution gates 61 and 63, or 62 and 64, the signals sampled across either condenser can be directed to the corresponding utilization circuits, connected at terminals 69 and 61, or 70 and 72.

The circuit operates as follows:

Considering, for instance, a coded group corresponding to channel No. 1 and received at 1 in FIG. 1, during a first time interval T assigned to the receiving and registering of that coded group, the bistable devices 13 to 17 of FIG. 1 are operated; at the end of this interval, the signals stored in 13 to 17 are transferred to the final memory 18 to 23 which will keep them in store for a further time interval of duration T. During the latter interval, gate 57 of FIG. 2 is open and gate 58 of FIG. 2 is closed. Subsequently, gate 26 is opened, condenser 55 is charged, and gate 26 is closed again.

At the end of its prescribed discharge time $T_1$, condenser 55 is isolated from the resistor system 33 to 37 by the closing of gate 57 under the action of a control pulse delivered by the time base 7 (FIG. 1) to its control terminal 59. Condenser 55, now isolated from the remainder of the circuit, retains its charging potential up to a later instant when said potential is "read out," i.e. directed through gate 51 controlled from 7 (FIG. 1) by a control pulse applied to its control terminal 65 to the input terminal 69 (FIG. 2) of the channel circuit for decoded signals corresponding to channel No. 1. The time interval available for the said "reading out" may still extend to nearly a full time interval T, till condenser 55 is required for the decording of a new odd channel signal.

Immediately after the closing of gate 57, gate 58 opens under the action of a suitably timed control pulse applied to its control terminal 60, and the assembly of condenser 56 and its associated gates 58, 62 is ready to play, with respect to the signals of channel No. 2 now stored in the memory 18 to 23 (FIG. 1), the same part as condenser 55 has just ceased to play with respect to the signals of channel No. 1.

In FIG. 2 may still be seen other gates such as 64 and 67, destined for other odd and even channels, respectively. Of course, the total number of such gates should be equal to that of all channels, odd and even, in the system.

Thanks to the just described arrangements, it is possible to extend the time allowed for the transfer of either condenser voltage to the corresponding channel utilization circuit to a full time interval T, substantially equal to the duration of one coded group, instead of a small fraction thereof. This is a significant improvement since, if one considers that, in a 12-channel telephone system using 8000-signal samples per second at its transmitting end and a six-digit code, the duration of a coded group is only about ten microseconds, which allows a little over one and a half microsecond for condenser voltage sampling. From the viewpoint of accuracy it is highly desirable that, after the sampling proper, a longer time be available for taking advantage of the sampled voltage across the condenser, to obtain maximum energy from the charge stored therein, as it is made possible by the arrangement of FIG. 2.

In the latter case, it may also be desirable to provide amplifiers inserted on one hand, between condenser 55 and the common lead to gates 63, 65, and on the other hand, between condenser 56 and gates 64, 66. The purpose of these amplifiers, which should have a high input impedance, is to avoid shunting across the condenser a too low impedance, which would discharge it too quickly and would make it impossible to take full advantage of the longer time allowed for the reading out of its voltage.

The provision of such additional amplifiers does not necessarily imply an increased cost of the equipment, since low-frequency channel amplifiers are usually provided in multiplex telephone systems, and since the latter could be dispensed with, thanks to the increased signal level at the output of the just-mentioned additional amplifiers.

Figure 3:
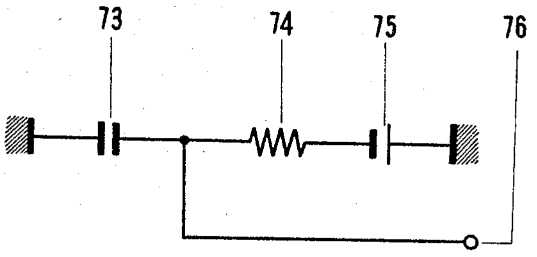
FIGS. 3 and 4 show in greater detail parts of the circuits of the decoder of the invention.
Figure 4:
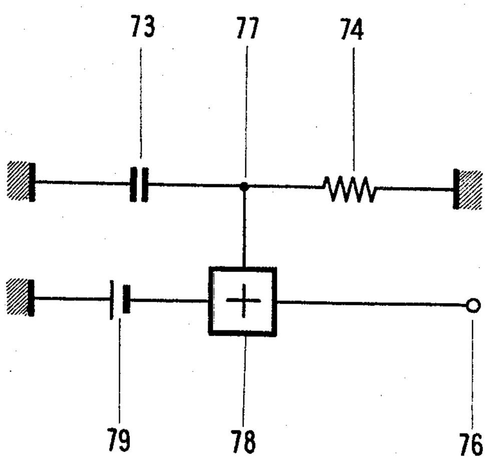

Referring now to FIGS. 3 and 4, the latter figures show some possible variants of embodiment of the equivalent circuit to that part of FIG. 1 which comprises condenser 24, resistors 33 to 37, and the additional network 38, replaced in FIGS. 3 and 4 by an equivalent direct-current voltage source 75. In FIGS. 3 and 4, resistance 74 is equivalent to the parallel assembly of some or all of resistors 33 to 37, condenser 73 replaces condenser 24, and its terminal 77 corresponds to terminal $24_1$ of FIG. 1.

The arrangement of FIG. 3 is the full equivalent of that of FIG. 1. A slightly different arrangement is shown in FIG. 4, in which the additional voltage, instead of being directly obtained from source 75 in FIG. 3, is now supplied through an "addition network" 78 made of a suitable arrangement of resistances. However, the presence of this network raises difficult questions as to the load on condenser 73. Other more or less complicated arrangements are also possible, some of which would seem theoretically simpler than that of FIG. 3, but the latter has been found the simplest and most efficient in practice.

It should also be understood that the invention is applicable, not only to a communication system using the special code specified above by way of example, but also to systems employing other conventional codes and, in particular, any code that can be derived from the above-mentioned one by permutation of the digits thereof. More complicated and arbitrary codes could also be employed, subject to the replacement of the memory system of FIG. 1 by an appropriate logic circuit, the realization of which is within the possibilities of anybody skilled in the art.

What is claimed is:

1. In an electric pulse code communication system using recurrent groups of coded pulses of constant duration and each having either of two possible signalling conditions, a decoder comprising means for receiving said coded pulses from a communication link, a time base synchronized by said recurrent pulse groups and delivering control pulses, at least a condenser, first and second direct-current-voltage sources, respectively, delivering a first constant voltage and a second constant voltage lower than said first constant voltage, first switching means for connecting said condenser to said first source and charging it to said first constant voltage at a first given time controlled by part of said control pulses, a plurality of resistors, second switching means controlled by said coded pulses and by part of said control pulses for connecting at a second given time later than said first given time at least part of said resistors in parallel connection between them, and a permanent connection between said second source and all said resistors, first gate means controlled by a further part of said control pulses for connecting at a third time later than said second given time said condenser to said parallel-connected resistors, second gate means for sampling the voltage across said condenser at a still later time spaced by a predetermined interval from said third time, and third gate means controlled by a still further part of said control pulses for impressing said sampled voltage upon a utilization circuit.

2. A decoder as claimed in claim 1, in which said first and second sources are respectively selected from a first and a second pair of sources each including two sources of equal voltages but of opposite polarities, said first and second selected sources always having opposite polarities.

3. A decoder as claimed in claim 2, in which each of said pair of sources consist of a direct-current-voltage source, the mid-point of which is grounded.

4. A decoder as claimed in claim 1, in which the voltage of said second source is applied through said second switching means to one terminal of the parallel assembly of said resistors, the other terminal of which is connected through said first gate means to said condenser.

5. A decoder as claimed in claim 1, in which said condenser is selected from a pair of condensers by further gate means controlled by part of said control pulses.

6. A decoder as claimed in claim 1, in which said second switching means comprise a first plurality of bistable devices sequentially rendered operative by part of said control pulses and to the inputs of which said coded pulses are applied, and a second plurality of bistable devices simultaneously controlled by part of said control pulses and the input of each of which is connected to the output of one distinct of said first-named bistable devices.

References Cited by the Examiner

IBM Tech. Disclosure Bulletin, vol. 6, No. 4, September 1963, pp. 110–111 relied on.

MAYNARD R. WILBUR, *Primary Examiner.*

DARYL W. COOK, *Examiner.*

K. R. STEVENS, *Assistant Examiner.*